Oct. 25, 1949.    M. KAPLOWITZ    2,486,169
PHOTOGRAPHIC SHUTTERS WITH COVER BLADE
AND MAGNETIC RETARDING MEANS
Filed Feb. 15, 1947    2 Sheets-Sheet 1
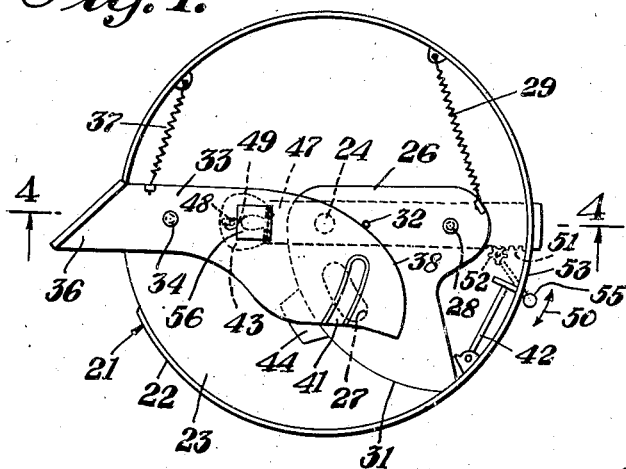
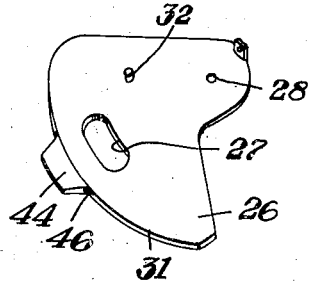
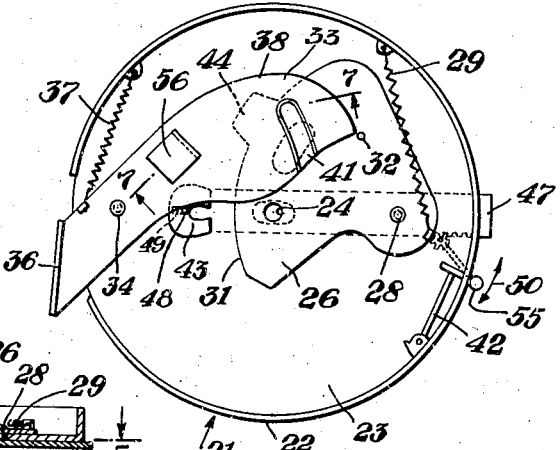
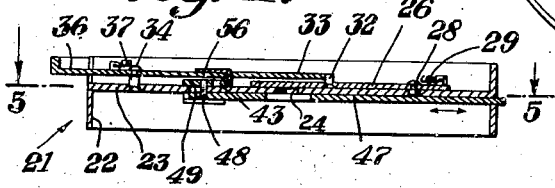
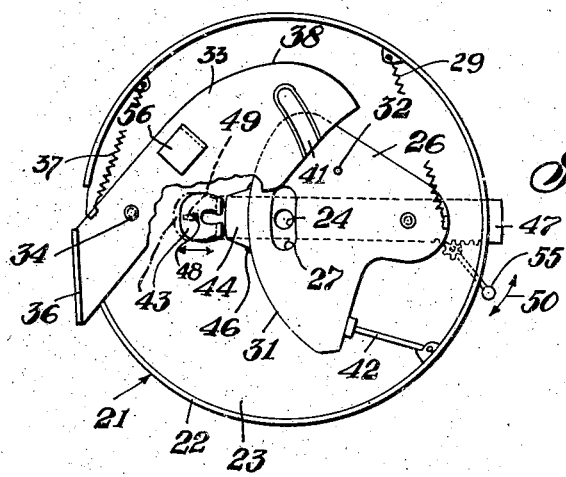
INVENTOR:
M. Kaplowitz
BY
his AGENT.

Oct. 25, 1949. M. KAPLOWITZ 2,486,169
PHOTOGRAPHIC SHUTTERS WITH COVER BLADE
AND MAGNETIC RETARDING MEANS
Filed Feb. 15, 1947 2 Sheets-Sheet 2

INVENTOR:
M. Kaplowitz
BY
his AGENT

Patented Oct. 25, 1949

2,486,169

UNITED STATES PATENT OFFICE 2,486,169

PHOTOGRAPHIC SHUTTER WITH COVER BLADE AND MAGNETIC RETARDING MEANS

Morris Kaplowitz, Brooklyn, N. Y., assignor to Federal Manufacturing & Engineering Corp., a corporation of New York Application February 15, 1947, Serial No. 728,812

5 Claims. (Cl. 95—60)

The invention relates to photography and relates more particularly to shutters for photographic cameras.

One of the principal objects of the invention is to provide a camera shutter with which a slow speed exposure can be made.

Another object of my invention is to provide such a shutter with adjusting means for varying the speed of exposure.

Another object of my invention is to provide such a shutter with magnetic means to retard the shutter blade during its exposure movement when the blade is in exposure position.

Another object of my invention is to provide such a shutter with a keeper for the magnetic means for conserving the magnetism thereof.

A further object of my invention is to provide a camera shutter with a uniform slow speed during exposure operation.

A still further object of my invention is the provision of magnetic driving means for impelling the shutter to make an exposure movement.

Further objects and advantages of the invention will be set forth in part in the following specification and in part will be obvious therefrom without being specifically referred to, the same being realized and attained as pointed out in the claims hereof.

Desirable features for camera shutters include means for relatively slow exposure speeds and, since the use of weak shutter springs is often the cause of uncertain and unpredictable exposure times, shutters are generally provided with strong springs and retarding devices. However, for inexpensive cameras it is uneconomical to use complicated retarding mechanisms, such as are employed for more elaborate shutters, and the photographic industry has tried to solve the problem of making an accurate retarder which is easy to assemble yet quite inexpensive, with varying success. The demand for low cost and for efficient retarding produced, in the past, various compromises wherein extreme simplicity had often to be sacrificed for workability and dependability.

I have provided a camera shutter with a retarding device which is most simple and very dependable and, at the same time, adjustable to various speeds and compares favorably with shutters of the elaborate type without exceeding the cost normally associated with inexpensive shutters.

With the above and other objects of the invention in view, the invention consists in the novel construction, arrangement and combination of various devices, elements and parts, as set forth in the claims hereof, certain embodiments of the same being illustrated in the accompanying drawings and described in the specification.

In the accompanying drawings,

Fig. 1 is a plan view of a shutter casing removed from a camera showing the shutter parts in position for an exposure;

Fig. 2 is a view similar to Fig. 1, but showing the shutter parts in position of the beginning of an instantaneous exposure;

Fig. 3 is a view similar to Fig. 1, but with the trigger depressed and the shutter blade halted in its intermediate position to produce a prolonged exposure;

Fig. 4 is a fragmentary sectional view taken along line 4—4 of Fig. 1;

Fig. 6 is a perspective view of the shutter blade removed from the shutter;

Fig. 7 is a sectional view of the cover blind taken along line 7—7 of Fig. 2;

Figure 5:
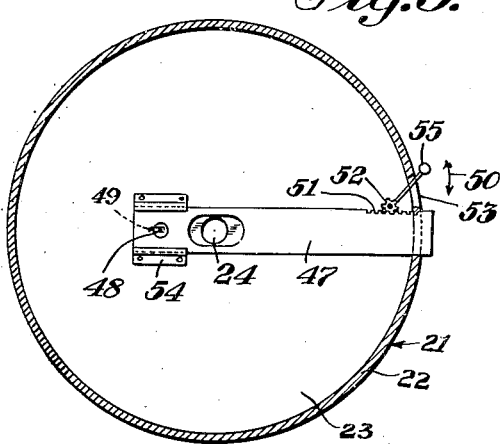
Fig. 5 is a sectional view taken along line 5—5 of Fig. 4.

In carrying the invention into effect in the embodiments which I have selected for illustration in the accompanying drawings and for description in this specification, I provide a simple shutter mechanism, generally designated 21, of well known construction which is disposed in a shutter casing 22. A wall 23 separates said shutter casing from the camera interior and has a centrally located exposure opening 24 through which light may be admitted to sensitize a film held in the camera interior. Said opening 24 is normally covered by a shutter blade 26 which is movable between a position of rest (Fig. 1) and a set position (Fig. 2) and is adapted to uncover said opening 24 during an exposure movement from the set position to the rest position. Said shutter blade 26 has an arcuate aperture 27 which will register with said opening 24 during the exposure movement of the shutter blade. Said shutter blade is rotatably mounted on a pivot 28 which is secured to and projects from said separating wall 23. A driving spring 29 is connected at one end to said casing 22 and at the other end to a portion of the shutter blade which is opposite to the aperture 27 with respect to the pivot 28. Said shutter blade has an outer edge 31 which is spaced from said aperture 27 and is substantially concentric with said arcuate aperture 27 around said pivot 28.

A pin 32 is mounted on said shutter blade and projects therefrom for a short distance and serves as a cam follower as will be explained hereinafter. A cover blind 33 forms part of the shutter mechanism 21 and has among its purposes moving of the shutter blade to the set position prior to the exposure and covering said exposure opening 24 during the setting movement of the shutter blade to prevent the passage of light through said opening when said aperture 27 is temporarily in register therewith. Said cover blind is mounted on a pivot 34 and in its rest position extends at one side over the exposure opening 24 and over a portion of said shutter blade 26 and forms on the other side integrally a trigger 36 extending to the exterior of said shutter casing 22 for permitting manual actuation of the shutter mechanism 21 by the operator.

A tension spring 37 resiliently connects said cover blind 33 to the casing 22 for returning the cover blind to its initial position of rest which is shown in Fig. 1. A portion of the outer edge of said cover blind 33 which is oppositely disposed to the trigger 36 with respect to the pin 34 is forming a cam 38. Said cam 38 cooperates with said pin 32 of said shutter blade to move the latter to a set position when the trigger 36 is depressed by the operator. Following the setting movement, when the shutter blade 26 has reached its set position, the pin 32 will slip off the cam edge 38 (as illustrated in Fig. 2), and the shutter blade 26 will automatically start on its exposure movement under the impulse of the driving spring 29. During that exposure movement which is entirely independent of the control of the operator, the cover blind 33 remains in its set position owing to the continued manual downward pressure exerted by the operator against the trigger 36. After the exposure, upon manual release of the trigger 36 the tension spring 37 will move the cover blind towards its initial position of rest. During that return movement the cover blind 33 engages by its shallow tapering groove 41 (see Fig. 7) the pin 32, thus permitting the cover blind to pass over the pin and again take up its initial rest position.

A "time" exposure lever 42 is pivotally mounted to the separating wall 23 and manually operable from the exterior of the casing 22 (not shown in detail). When the lever 42 is turned from the position shown in Fig. 1 to that shown in Fig. 3, it will move the shutter blade 26 until the aperture thereof is in register with the exposure opening 24. "Time" exposures are then performed by simply depressing the trigger 36 whereby the cover blind 33 sets the shutter blade which, after release, will return to the "time" position abutting against the lever 42, as shown in Fig. 3.

Returning now to the description of instantaneous exposure and referring particularly to Fig. 1, the driving spring 29 is a relatively powerful coiled spring which is capable of returning the comparatively light shutter blade to its initial position upon release from the cover blind, regardless in what position the camera is held by the operator. Due to the strength of the spring 29, the returning motion of the shutter blade is very fast and consequently the exposure time is extremely short.

In order to increase the exposure time to a period which will allow the taking of satisfactory photographic pictures under normal circumstances, I provide magnetic retarding means to slow the speed of the shutter blade during the exposure, as will be presently explained. The presence of magnetic means within the shutter casing, however, necessitates the provision to make preferably all parts, not directly contributing to the retarding means, of non-magnetic material, as will be readily understood by those skilled in the art. Consequently, the shutter casing 22, the pivots 28 and 34, the springs 29 and 37, the cover blind 33, the pin 32, the lever 42, and, in certain instances, the shutter blade 26, will preferably be made of non-magnetic material, such as brass or copper, plastic or fiber, or other suitable material. If this provision were not made and the parts were susceptible of magnetization, most of them would soon become magnetized by the presence in the shutter casing of a permanent magnet and the accuracy of the mechanism would deteriorate.

Referring now particularly to Figs. 1–6, I provide a permanent magnet 43 that may be, for instance, a horseshoe type magnet; the magnet 43 is spaced from the outer edge 31 of the shutter blade 26 when it is in its rest position. Preferably, this permanent magnet 43 is composed of high-energy alloys, mainly of aluminum, nickel, copper, cobalt and iron, for instance of an alloy known under the trade names "Alnico," "Cunico," "Comol," "Vectolite," and "Silmanal," having the property of retaining its magnetism for a practically indefinite time; though small in size, this type magnet is surrounded by a relatively powerful magnetic field. A small magnetizable element composed of a strip of iron 44 is mounted to the shutter blade 26 at the outer edge 31 and projects therefrom for a distance and is located adjacent the midway portion of the arcuate aperture 27 of the shutter blade. This strip 44 is secured to the edge 31 of the shutter blade by solder 46 or by any other suitable, well known means.

During the exposure movement of the shutter blade, the strip 44 will pass adjacent the magnet 43 and thereby through the magnetic field thereof at the moment when the aperture 27 is in register with the opening 24 and will be retarded through the magnetic influence of the magnet 43 on the strip 44; this influence will have a maximum effect when the two elements, the magnet and the strip, are opposite each other like in the position shown in Fig. 3. The two elements, however, never touch each other and the magnetic force therebetween is sufficient to retard the speed but insufficient to bring to a halt the exposure movement of the shutter blade.

The two elements, the magnet 43 and the strip 44, although always being spaced are separated in their position of closest proximity (Fig. 3) only for an extremely small space, much smaller in fact than the drawing admits of illustration. This extremely small space is necessitated for a good working effect, since the elements are small in size and the magnetic influence correspondingly restricted in power. It will be understood, therefore, that the showing in the drawing is only by way of illustration and does not necessarily accurately represent the dimensions involved, as will be readily comprehensive to those skilled in this and related arts.

This type retarder approximates the optimum retarding condition, namely providing for retarding only at the moment of exposure and permitting increased speed before and after the exposure. In order to accentuate that effect, the strip of iron 44 as best illustrated in Fig. 6 may preferably be tapered and have a mass which is unequally but symmetrically distributed over the length of the strip 44, so that the mass will be greatest at the center thereof, whereby the retarding of the speed will be gradual as the strip approaches the magnet during its path, and the taking up of speed after passing the magnet will also be gradual.

The magnet 43 is connected to an arm 47 by means of a square pin 48 which protrudes through a longitudinal slot 49 of said separating wall 23. The longitudinal extension of said slot 49 is in a direction towards said pin 28 and the pin 48 is movable in said slot 49 for shifting said magnet 43 between two opposite extreme positions, of greatest proximity and greatest distance, with relation to the path of said strip of iron 44. The space between these two extreme positions is, of necessity, quite small, as a distance increase between the two elements 43 and 44 reduces the magnetic influence therebetween at the rate of the square root of said increase in distance.

Said arm 47 is guided along the surface of said separating wall 23 and extends to the exterior of the casing 22 and carries a toothed rack 51 which is in mesh with a pinion 52, to which a lever 55 is connected extending to the exterior of the casing 23, for a manual shifting of said magnet. Said lever 55 is swingable in opposite directions, as indicated by an arrow 50, to change the position of the magnet 43. The outside of the casing 23 may carry a graduation at 53 opposite the lever 55 to indicate the shutter speed, which is not shown in detail in the illustrated views.

A keeper 56 is provided for the magnet 43 which is composed of iron and normally in contact with or very near the magnet 43. As best shown in Fig. 7, the keeper is secured to the top of the cover blind 33, and penetrates through a slot thereof to extend in front of the magnet 43, when the cover blind 33 is in rest position.

In the foregoing, the two elements which exert magnetic influence upon each other and constitute the magnetic means were described as so distributed that the element which is mounted on the shutter blade is non-magnetic, but may be magnetized, and the other element, which is stationary with relation to the movement of the first element, consists of a magnet. The positions of magnet and iron strip may be reversed however, and the shutter blade may carry the permanent magnet and the strip of iron accordingly be connected to the arm 47.

Furthermore, each of the two elements of the magnetic means may consist of a permanent magnet and, depending on the position of each with respect to distribution of magnetization, the magnetic influence therebetween may cause either attraction or repulsion.

Instead of fastening one of the magnetic elements to the shutter blade 26, the shutter blade itself may constitute the second element. The retarding, however, will here be different from the foregoing described procedure, since it will be more or less uniform over the entire exposure movement and will be only enhanced at the moment of exposure as the shutter blade is formed with a projection at the place which was occupied in the former modification by the iron strip 44. In this modification, the shutter blade has to be made of magnetizable material, and this forms one of the exceptions to the previously mentioned condition that all shutter parts be non-magnetic, referred to in the earlier part of the description.

Still furthermore, the entire shutter blade may be made of magnetic material and so constitute the magnet of the device, influencing a shiftable magnetizable element which takes the place occupied by the magnet 43 in the first of the foregoing embodiments.

Further modifications embodying magnetic means for retarding are shown in Figs. 8-12; this subject matter is claimed in my co-pending application, Ser. No. 106,144, filed July 22, 1949; referring now particularly to Fig. 8, I provide a permanent magnet 57 in form of a star wheel having a plurality of symmetrically disposed arms 61; said star wheel magnet 57 is secured to the shutter blade 26 and mounted concentrically therewith on the pivot 28 for moving in concentric rotation with the shutter blade. The star wheel is shown with arms 61 disposed along the periphery of a circle. However, in order to have a greater retardation at a certain position of the blade 26 than at other positions, two or more opposite arms 61 may be made longer than the remaining arms (not shown in detail). A C-shaped member 58 partially surrounds the contour of said star wheel magnet 57 and is made of iron or other suitable material responsive to magnetic influence. Said member 58 has two oppositely disposed ends 59 which normally lie adjacent two opposite arms 61 of the star wheel 57. The space between each arm 59 and the adjacent arm 61 of the star wheel is extremely small and, as previously has been pointed out, the dimensions of the drawings in this respect should be understood to be only illustrative, in this view as well as the remaining views.

Figure 8:
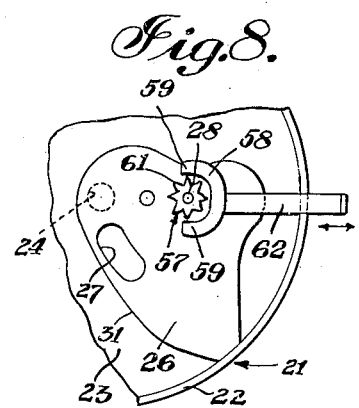
Fig. 8 is a view similar to Fig. 1, but showing a fragment only and embodying a modification.
Figure 9:
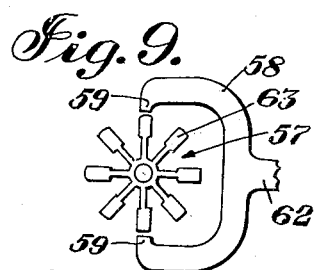
Fig. 9 is an enlarged fragmentary plan view of a modified retarding device removed from the shutter.
Figure 10:
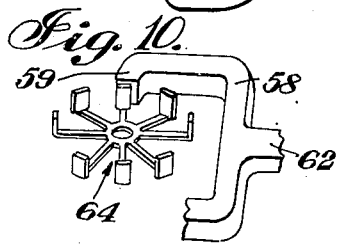
Fig. 10 is a fragmentary perspective view of a further modification.

The member 58 constitutes the second element of said magnetic retarding means and forms at the same time a keeper for the magnet as, in the normal position, lines of magnetic force pass from the magnet through one end 59 of the member 58 and return to the magnet through the other end 59. Similarly to the previous modifications said C-shaped member 58 forming the second element of said magnetic means is mounted on a shiftable arm 62 and is movable thereby in a similar manner for selectively changing the exposure speed of the shutter blade, although the construction is not repeated here in detail. The arms 61 of the star wheel 57 may be pointed as shown in Fig. 8, or may be rectangular, as shown in Fig. 9 and designated 63, or still further, may be bent upward thereby forming a star wheel 64 having a cylindrical contour as illustrated in Fig. 10.

The position of the magnet among the two elements of the magnetic retarding means may again be reversed, and the C-shaped member may consist of a permanent magnet and the star wheel may be made of iron, so as to be responsive to the magnetic influence of said member 58. This reversal does not influence the effective operation of the retarder, since the action of magnetic retarding resides in the magnetic influence intermediate the movable element and the relatively stationary element regardless of which of these elements is surrounded by a magnetic field and which cooperates in the retarding force by entering the magnetic field of the other element.

The use of any magnetic retarder is not restricted to a particular type shutter, such as the single blade shutter in association with which it has been described in the foregoing, or to photographic shutters altogether and may equally well be utilized for retarding other mechanisms.

Figure 11:
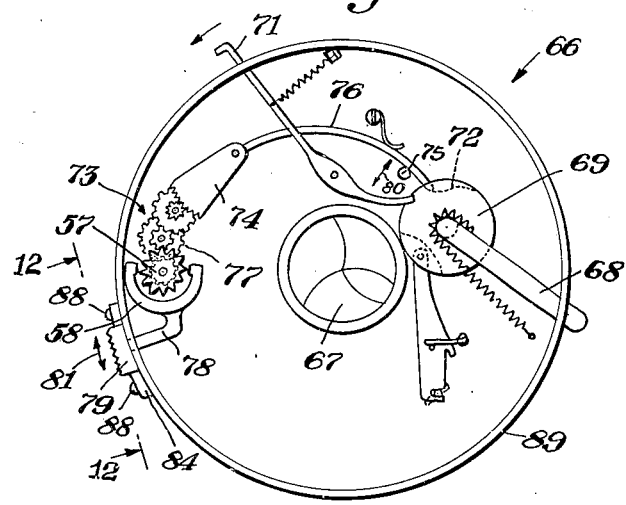
Fig. 11 is a plan view of a modified shutter with the shutter cover plate removed and showing a retarder.

In Fig. 11, for the purpose of further exemplification, I have illustrated magnetic retarding means in connection with a multi-leaf shutter 66 of well known type, which includes a control ring (not shown) to operate shutter leaves 67, a spring controlled setting lever 68, a master member 69 and a trigger 71 adapted to be latched temporarily to the master member 69 after the latter has been set. A cam 72 is associated with said master member 69 for controlling a retarding mechanism 73. Said retarding mechanism comprises a pivoted gear segment 74 to which a lever 76 is connected the free end of which is resiliently pressed against said cam 72 and constitutes a cam follower therefor. A gear train 77 is in driving engagement with said gear segment 74 and is adapted to be operated thereby. Said gear train 77 serves the purpose of increasing the angular velocity of succeeding gears in a direction from the gear segment to the other, free end of said gear train. At said free end a star type permanent magnet 57 is secured to the last gear and concentrically pivotally mounted therewith and is partially surrounded by a C-shaped member 58 similar to the arrangement shown in Fig. 8. Said C-shaped member 58 is carried by one leg of an L-shaped arm 78, the other leg thereof extending to the exterior of the shutter casing and secured there to a knurled knob 79. Said knob 79 is movable in opposite directions as illustrated by an arrow 81 for shifting the position of said C-shaped member 58 thus changing the magnetic retarding influence when the gear train is operated and varying the angular speed of the star wheel 57, whereby the shutter exposure speed will be varied. Instead of coupling the C-shaped member for direct move with the knob 79, any well known reducing mechanism may be interposed therebetween to reduce the extent of movement of the C-shaped member to a smaller rate compared to that of the knob 79, so that a relatively long distance covered by the movement of the latter may be translated to a very small movement of the former, for allowing only substantially a minute movement for the C-shaped member, whereby the magnetic influence between the same and the star wheel will nevertheless be materially changed, as has been hereinabove explained.

Said knob 79 carries an indicator 82 adjacent a gradation 83 which is carried on a strip 84. Said strip 84 is movable in opposite directions, as indicated by an arrow 86 for adjusting the position of the gradation 83 with relation to the indicator 82. This adjustment is provided by two longitudinal slots 87 in the strip 84 through which screws 88 protrude which fasten the strip to the wall of the shutter casing 89. By loosening the screws 88 the strip 84 may be shifted to a desired position and subsequently the screws be tightened again.

This shifting of the strip 84 is designed to compensate for any losses of the magnetic force in the permanent magnet 57 which may take place over a protracted period of time. Normally, this loss is extremely small, but since the type shutter shown in Fig. 11 is designed to give extremely accurate exposure times, this adjustment is provided to permeate the high degree of precision of these shutters. Instead of using a star wheel of the type shown in detail in Fig. 8, any other type of star wheels of Fig. 9 or 10 may also herein be employed, if desired, or other similar star wheels.

In a preferred construction, however, an additional cam 75 is provided near the free end of said lever 76 and movable in the direction of an arrow 80 by means of a manual moving mechanism (not shown), so that the length of exposure time may thus be controlled in a conventional manner. In this embodiment, the shifting of the C-shaped member 58 is used only for adjustment, to correct the shutter speeds, should any change thereof have taken place, after the shutter has left the factory where it was made.

Since the retarding device 73 of this shutter is located at a distance from the other parts of the shutter, it will be sufficient to make the casing 89 and the gear train 77 of non-magnetic material, whereas the remainder of the parts are not subject to this restriction, without risking the danger of magnetization of the entire shutter mechanism.

Figure 13:
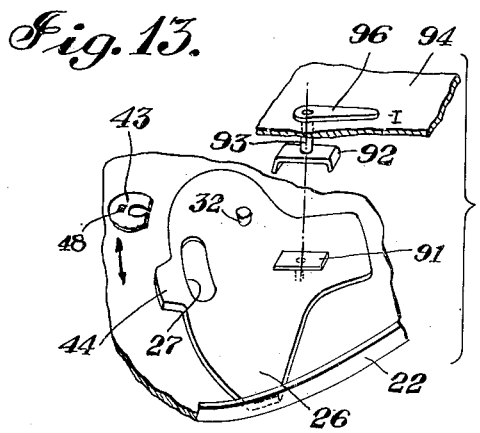
Fig. 13 is a fragmentary extended view, in perspective, of a shutter blade and magnetic power means.
Figure 12:
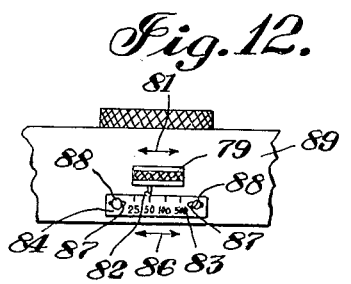
Fig. 12 is a fragmentary elevational view as seen along line 12—12 of Fig. 11.

Magnetic means may also advantageously be employed in a shutter mechanism for moving the shutter blade to make an exposure. In Fig. 13, I have shown a shutter blade 26 similar to that illustrated in Fig. 1, pivotally mounted in a shutter casing 22 and operated by a cover blind (not shown in this drawing) as previously explained. A rectangularly shaped magnet 91 is secured to the shutter blade 26 at the pivot point thereof. A second magnet 92, preferably of C-shaped structure, is mounted extremely near said first magnet 91 with the free opposite ends turned towards the same, but is spaced therefrom and is carried on one end of a shaft 93 which extends to the exterior at the front wall of the shutter casing 94 and is secured there to a shifting lever 96. Said shifting lever 96 may be shifted between two positions, one marked "I" for "instantaneous" exposures and the other marked "T" for "time" exposures. In Fig. 13, said lever 96 is shown in a position for instantaneous exposures and since the north pole of one magnet in this position faces the south pole of the other magnet, the shutter blade, although it is not provided with a driving spring, will always return to the initial position of rest after it has been moved therefrom to a set position by a cover blind and subsequently been released of its engagement therewith.

The magnetic force replaces here the driving spring, which offers distinct advantages over spring driven constructions. Since the power of a spring is resilient, a shutter rebound often takes place after the exposure movement with a resulting subsequent second exposure of the film. This is prevented effectively by the magnetic means, as magnetic force is not resilient, but strongly forces the shutter blade to stay in the rest position after the exposure movement. Furthermore, the driving force of a spring increases in linear relation with the longitudinal extension of the spring; therefore the greatest driving force is applied against the shutter at the beginning of the exposure movement resulting in a rapid start of said movement with a consequent rapid exposure speed, unless a separate retarder is provided. Magnetic force, on the other hand, is characterized by a rapid decrease with increasing distance—of square root ratio—resulting in a slow exposure movement at the beginning with a consequent longer exposure time.

When the lever 96 is shifted to the position of "time" exposure, the second magnet 92 is rotated to a position different from that shown in Fig. 13, and the shutter blade after it has been moved to a set position will be driven by the magnet in a return movement, but will come to rest at a "time" exposure position wherein the shutter aperture 27 is in register with the exposure opening 24.

In order to decrease the shutter speed, a separate magnetic retarding device may be provided of the type illustrated in Fig. 1.

I do not limit myself to the particular details of construction set forth in the foregoing specification and illustrated in the accompanying drawings, as the same refer to and set forth only certain embodiments of the invention and it is obvious that the same may be modified, within the scope of the appended claims, without departing from the spirit and scope of the invention.

Having thus described the invention, what I claim as new and desire to be secured by Letters Patent, is as follows:

1. Magnetic retarding means, for use in connection with a camera shutter mechanism including a shutter casing, a reciprocably movable shutter blade, and a cover blind movable to and from a normal rest position and adapted to actuate said blade, said retarding means comprising a magnet disposed in said shutter casing and independent of the movement of said shutter blade, a magnetizable element connected to said shutter blade and adapted to cooperate with said magnet to retard the movement of said shutter blade, and keeping means mounted on said cover blind and normally disposed sufficiently near said magnet when the cover blind is at rest for restraining loss of magnetic energy thereof and to be removed from said magnet when the cover blind is moved from its rest position.

2. Magnetic retarding means, for use in connection with a camera shutter mechanism including a shutter casing having an exposure opening, a shutter blade in said casing having an aperture and reciprocably movable about a pivot to register said aperture with said exposure opening, and a cover blind movable to and from a rest position and adapted to actuate said blade to make an exposure, said retarding means comprising a magnetizable element associated with said shutter blade and movable therewith in an arcuate path, a magnet disposed in said casing adjacent the path of said element and located outside the area covered by said blade and said element during their movement, said element and said magnet arranged to be substantially oppositely disposed when said aperture and opening are in register to exert a maximum magnetic influence in that position for momentarily retarding the speed of the shutter blade, and a keeper connected to said cover blind and disposed adjacent said magnet when said cover blind is at rest, for restraining loss of magnetic energy thereof, and adapted to be removed from said magnet when the cover blind is moved from its rest position.

3. Magnetic retarding means, for use in connection with a camera shutter disposed in a casing and including a reciprocably movable spring tensional shutter blade and a spring tensioned cover blind for actuating said blade and movable to and from a rest position, said retarding means comprising a magnetizable element connected to said shutter blade and movable therewith in a predetermined path, a magnet disposed in said casing adjacent the path of said element and movable independently of said blade towards and from said path to adjust the magnetic influence exerted upon said element for adjustably retarding the speed of said shutter blade, and a keeper connected to said cover blind and disposed adjacent said magnet when said cover blind is at rest and movable with said cover blind to be separated from said magnet when the cover blind is moved, said keeper covering an area sufficiently large to prevent the loss of magnetic energy of said magnet when the cover blind is at rest independently of the position to which the magnet has been adjusted.

4. In a photographic shutter, the combination with a shutter casing having an exposure opening therein, a shutter mechanism adapted to cover and to uncover said exposure opening including a movable shutter blade, and means for operating said shutter mechanism including movable means actuable for moving said shutter blade to make an exposure, of magnetic means arranged to retard the exposure movement of said shutter blade comprising a movable element connected to said shutter blade and movable therewith in a predetermined path, a second element mounted in said casing adjacent the path of movement of said movable element spaced therefrom and movable in opposite directions at an angle to said path, said elements so disposed that they will be facing each other across a minimal distance during the exposure position of said blade, one of said elements including a permanent magnet and the other element including a magnetizable member adapted to be magnetically influenced by said magnet when said elements are sufficiently close to each other to retard said blade movement, and keeping means connected to said blade moving means and movable by said means to be normally disposed sufficiently near said magnet for restraining loss of magnetic energy thereof and to be moved away from said magnet by said blade moving means upon actuation thereof.

5. In a photographic shutter mechanism, the combination with an apertured movable shutter blade normally in a position of rest, a cover blind normally in a rest position and adapted to be actuated to move the shutter blade to a set position, and means for returning the shutter blade to its original position of rest, of magnetic means arranged to retard the movement of said shutter blade comprising an element including a magnet and an element including a magnetizable member adapted to cooperate with said magnet, one of said elements connected to said shutter blade and movable therewith and the other element disposed adjacent said shutter blade and selectively movable from and towards the same for increasing and decreasing, respectively, the magnetic influence between said elements, said elements so arranged that they will be nearest each other during the exposure position of said blade, and keeping means associated with said cover blind for preventing the loss of magnetic energy of said magnet, said keeping means arranged to be moved by said cover blind into a normal position adjacent said magnet when the cover blind is in a rest position and to be removed therefrom by said cover blind when the cover blind is actuated to move the shutter blade.

MORRIS KAPLOWITZ.

REFERENCES CITED

The following references are of record in the file of this patent:

UNITED STATES PATENTS

| Number | Name | Date |
|---|---|---|
| 1,250,354 | Ricketts | Dec. 18, 1917 |
| 2,055,089 | Roters | Sept. 22, 1936 |
| 2,134,982 | Mock | Nov. 1, 1938 |
| 2,347,699 | Magnus et al. | May 2, 1944 |

Certificate of Correction

Patent No. 2,486,169

October 25, 1949

MORRIS KAPLOWITZ

It is hereby certified that error appears in the printed specification of the above numbered patent requiring correction as follows:

Column 10, line 12, for "tensional" read *tensioned*;

and that the said Letters Patent should be read with this correction therein that the same may conform to the record of the case in the Patent Office.

Signed and sealed this 21st day of February, A. D. 1950.

[SEAL]

THOMAS F. MURPHY,
*Assistant Commissioner of Patents.*